Dec. 31, 1946.  J. J. TEIGE ET AL  2,413,422
CHUCK
Filed June 20, 1944

Inventor
John J. Teige and
William Raymond Thomas

Patented Dec. 31, 1946

2,413,422

UNITED STATES PATENT OFFICE 2,413,422

CHUCK

John J. Teige and William Raymond Thomas, Baltimore, Md., assignors to The Black and Decker Manufacturing Company, Towson, Md., a corporation of Maryland Application June 20, 1944, Serial No. 541,163

4 Claims. (Cl. 279—64)

The invention relates to a chuck, particularly adapted to use as a drill chuck but capable of more general application to portable power driven rotary tools and in other fields.

The majority of the chucks now in use are of a type which is comparatively expensive to manufacture because of complicated machine work which is essential to the production of the tapered sleeve or housing and to the tapered boring and internal threading of the sleeve or housing. The jaws also constitute a considerable item of expense to which the tapered threading of the jaws and the linking of the jaws to the operating plate contribute.

Another item of expense results from the relatively difficult operation incident to assembling the chucks of the older types referred to.

The chuck of the invention is simpler, easier to manufacture, and therefore cheaper and is also sturdier and of longer life than the standard product referred to, and the parts because of their improved construction are much more easily assembled which is of importance in reducing the over-all expense.

More specifically the clutch sleeve or housing of the invention can be readily formed by forging or die-casting and its production involves no drilling of holes and the jaws are not threaded and preferably they are not linked to the operating plate or abutment and there are no tapered holes or internal tapered threads.

Because of the feasibility of manufacturing these important elements of the chuck in this way, accuracy of construction and precision of operation can be attained and controlled by means of accurately made forging dies or die-casting dies, whereby the requisite precision is attained at considerably lower cost than in the production of the earlier types of chuck in which the parts to attain corresponding precision must be individually machined to close tolerances.

In the accompanying drawing we have illustrated a chuck embodying the features of our invention in what is at present regarded as the preferred form.

In the drawing

Figure 1:
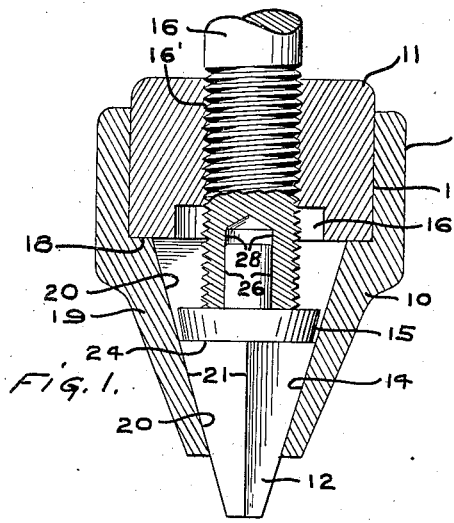
Fig. 1 is a section on a plane of the spindle axis, the jaws being in advanced or closed position.
Figure 2:
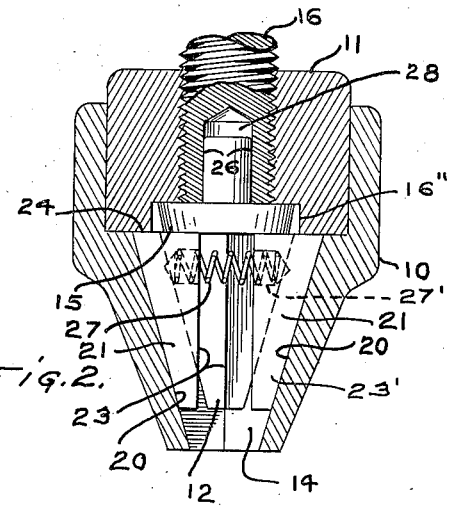
Fig. 2 is a similar view with the jaws open and hence in the retracted position.

Having particular reference to Figs. 1 and 2, the chuck as shown consists of a housing member 10 having its lower half in the form of an inverted frusto pyramidal jaw chamber 14, a body or plug member 11 which fits into and closes the top of the housing above said chamber, downwardly tapered jaw members 12 which slide in the correspondingly tapered chamber 14, and jaw-operating plate 15 shown as carried by the lower end of the spindle 16 which is threaded downwardly through the body or plug 11, all of said parts and features being subject to a degree of change and modification within the skill of the ordinary mechanic.

In the form shown, the housing 10 has a hollow upper portion 17 shown as cylindrical and open upwardly to receive the correspondingly shaped body-member 11. The hole 17' within the said upper portion 17 terminates at its lower end in an internal horizontal shoulder 18 on which the body-member 11 rests in its assembled position.

Figure 4:
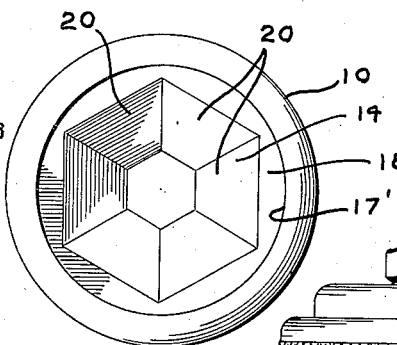
Fig. 4 is a view similar to Fig. 3, the jaws also being removed.
Figure 6:
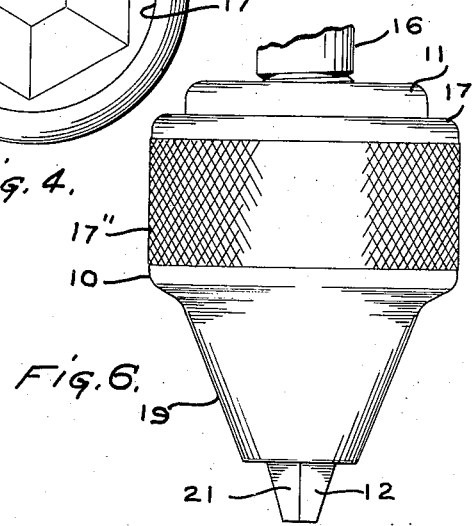
Fig. 6 is an elevation of the chuck fully assembled.

The lower half of the housing or sleeve 10 as viewed externally in Fig. 6 is of downwardly reducing cross-section at 19. This downwardly tapered portion 19 contains the jaw chamber 14 extending downwardly from the shoulder 18. This chamber 14 is of downwardly reducing taper, its inside wall section being of hexagonal or of other suitable cross-section to correspond to the jaw section, the inner surfaces of the walls being plain, flat and smooth as indicated at 20 in Fig. 4.

Figure 3:
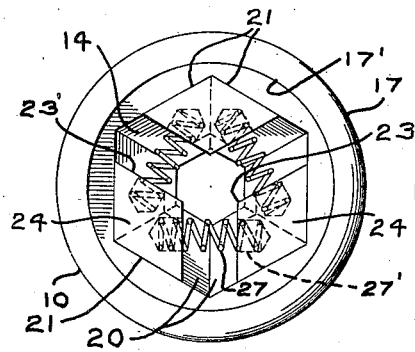
Fig. 3 is a top plan view of the chuck with the body-member, which normally closes the top of the housing, removed.
Figure 5:
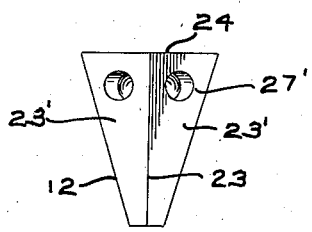
Fig. 5 is an outside elevation of one jaw-member removed.

The jaws 12 shown separately in Fig. 5 and combined in Figs. 1, 2, and 3, form when closed a member of downwardly reducing taper, similar to that of the walls 20 of chamber 14, their external surfaces 21 being flat and the jaws being so formed that they fit together in the form of an inverted frustum of a pyramid of hexagonal or other suitable cross-section as best shown in the closed position in which they appear in Fig. 1. These individual jaws 12 as shown also taper inwardly in a horizontal plane to inwardly disposed or gripping edges 23. To admit and receive the shank of a relatively large drill, the inwardly disposed edges 23 of the jaws are spaced as shown in Figs. 2 and 3. As the jaws are moved toward closed position, the flat vertical side surfaces 23' and edges 23 approach and may finally contact.

The combined top surfaces 24 of the jaws 12 are preferably flat and adapted to be engaged from above by the operating plate or abutment 15 which as shown may have upper and lower horizontal flat surfaces, and an upwardly projecting central stud 26 which fits in a central vertical hole 28 in the bottom of the spindle 16. A tendency on the part of the jaws 12 to move to open position is imparted by compression springs 27 which span the openings between adjacent jaws 12, said springs having their ends seated in aligned openings 27' in the opposed surfaces 23'.

In assembling the chuck, the body-member or plug 11 being of suitable size and shape would be forced into the cylindrical or otherwise suitably formed straight sided opening 17' in the top portion 17 of the housing 10 with a press-fit or it can if desired be otherwise secured. This body-member or plug 11 is first threaded on the spindle as shown, the stud 26 of the operating plate 15 being thrust upwardly into the hole 28 in the bottom of the spindle, abutment or plate 15 being located in the chamber 14 and directly over the jaws 12 as shown in Figs. 1 and 2. It is to be noted that the hole 16' in the body or plug 11 may be counter-sunk at its lower end at 16'' to admit the actuating plate 15 in the wide open position of the jaws as best shown in Fig. 2.

This operating plate 15 is, in closing the chuck, pressed downwardly against the upper ends or combined top surfaces 24 of the jaws 12, closing them by the wedge action which results from contact of the outer jaw surfaces 21 with the inclined inner surfaces 20 of the hex chamber 14.

It will be easily understood that by rotating the housing member or sleeve 10, which may be externally knurled as at 17'' to improve the grip, the chuck may be engaged and/or released, i. e., the jaws being clamped or released by thus lowering and/or raising the plate 15. This plate when lowered, forces the jaws downwardly in chamber 14 toward the position Fig. 1 which is the closed position and when raised, permits them to be raised to the position Fig. 2 in which position they are opened by springs 27. It is important to note that both the jaws 12 and the chamber 14 have cooperating external and internal plain, flat downwardly tapering and downwardly converging surfaces whereby the jaws are closed as they are forced downwardly from above.

It is of importance to note that the housing 10 and the body member 11 and the tapered jaws 12 are so formed that they may be made by the use of suitable dies, i. e., by forging or die-casting, the features of the chucks as above referred to which in production require machining to close tolerances being eliminated. Thus the chuck may be made with the required degree of accuracy at a considerably reduced expense. Also the simplification of these parts and the elimination of the jaw threads and the corresponding tapered internal threads and other details, contribute not only to a reduction of the cost of these parts, but also to the ease and convenience of assembly, and hence a reduction of the total cost of production. The improvements herein described also give a better and sturdier product of increased life and reduced expense as to its upkeep or maintenance.

We have thus described specifically and in detail a single embodiment of our invention in order that the manner of constructing, applying, operating and using the same may be fully understood; however, the specific terms herein are used in a descriptive rather than in a limiting sense, the construction shown being subject to modification within the skill of the average mechanic and the scope of the invention being defined in the claims. What we claim as new and desire to secure by Letters Patent is:

1. A chuck having a housing with top opening and a body member permanently secured in closing relation to said opening, the housing comprising a jaw chamber below said body member and of downwardly reducing taper, said chamber having angularly joined flat downwardly converging and tapering side wall surfaces and a jaw assembly comprising a plurality of cooperating jaws in said chamber, said jaw assembly having correspondingly angular and plane downwardly converging and tapering external back walls and means for forcing said jaw assembly downwardly in said chamber to close the jaws.

2. A chuck according to claim 1 in which said latter means comprises an abutment engaging the top ends of said jaws with a downward thrust only, thereby forcing them downwardly in said chamber and closing them, and means for moving the jaws upwardly and opening the jaws upon the upward withdrawal of said abutment.

3. A chuck for holding a tool, a body member, a housing rigidly held at the top by said body member the inner walls of said housing beneath said body member being angularly joined, downwardly and inwardly inclined plane surfaces, a cross section being a regular polygon, a plurality of jaws each having correspondingly angular and flat inclined surfaces engaging two of said walls which adjoin whereby their rotation relative to said housing is prevented when clamped upon a tool, and means for moving said jaws lengthwise in said housing to close the jaws.

4. A chuck for holding a tool, a body member, a housing rigidly held at the top by said body member the inner walls of said housing beneath said body member being angularly joined, downwardly and inwardly inclined plane surfaces, a cross section being a regular polygon, a plurality of jaws each having correspondingly angular and flat inclined surfaces engaging two of said walls which adjoin whereby their rotation relative to said housing is prevented when clamped upon a tool, a spindle threaded through said body member and adapted upon turning to force said jaws downwardly in said housing to close the jaws, and means to expand and elevate said jaws upon the retraction of said spindle.

JOHN J. TEIGE.
WILLIAM RAYMOND THOMAS.